(No Model.)  J. B. ATWATER.  5 Sheets—Sheet 1.
ELECTRIC MOTOR.

No. 539,849.  Patented May 28, 1895.

(No Model.) 5 Sheets—Sheet 2.
J. B. ATWATER.
ELECTRIC MOTOR.
No. 539,849. Patented May 28, 1895.

Witnesses:-
Louis H. F. Whitehead.
C. Severance.

Inventor:-
John B. Atwater
by Mann Fenwick Lawrence
Attorneys.

(No Model.) 5 Sheets—Sheet 3.

J. B. ATWATER.
ELECTRIC MOTOR.

No. 539,849. Patented May 28, 1895.

Witnesses: Louis M. F. Whitehead. C. Severance.

Inventor: John B. Atwater
by Munn Fenwick & Lawrence Attorneys

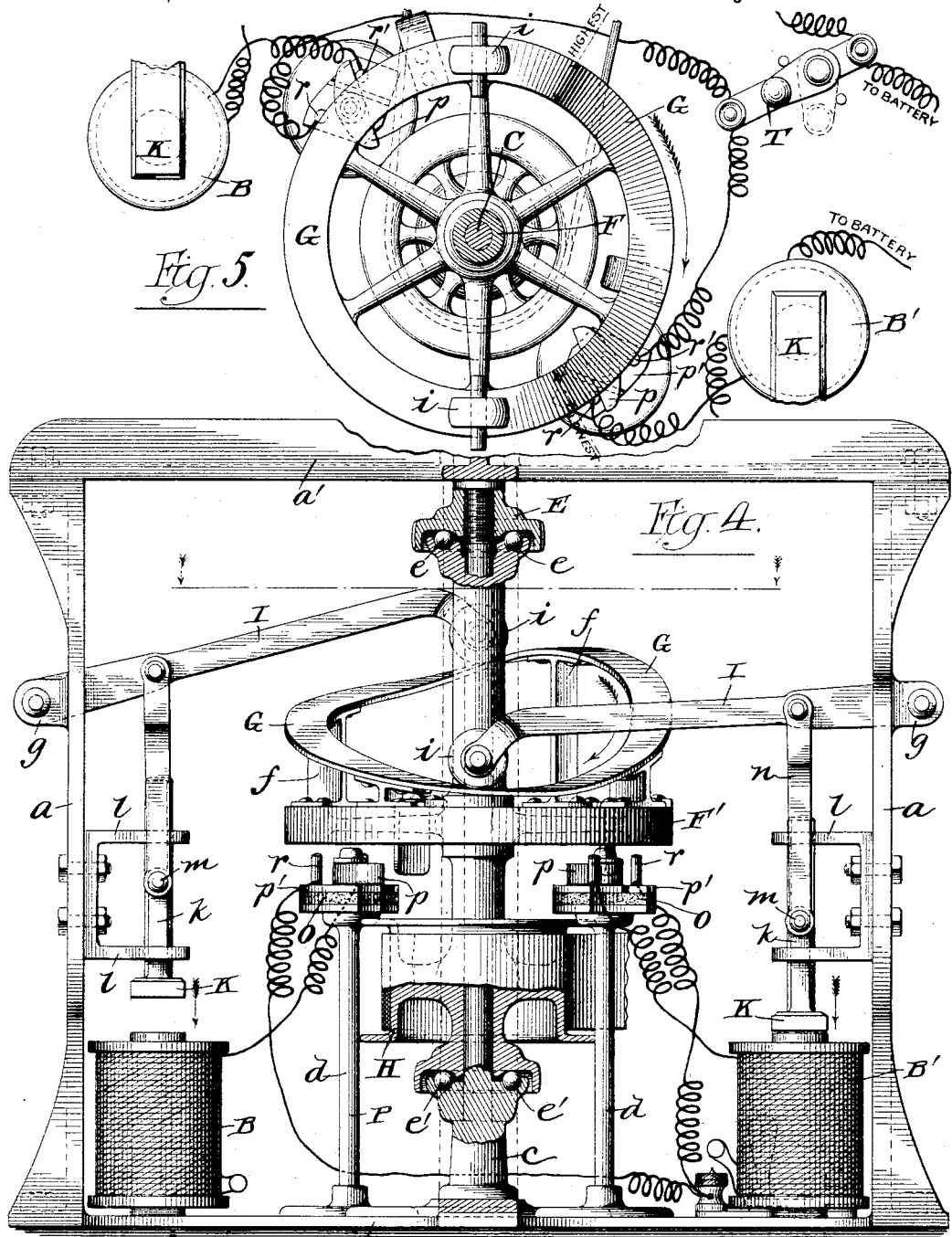

(No Model.) 5 Sheets—Sheet 5.

J. B. ATWATER.
ELECTRIC MOTOR.

No. 539,849. Patented May 28, 1895.

Witnesses:
Louis M. F. Whitehead.
C. Severance

Inventor:-
John B. Atwater
by Mason Fenwick & Lawrence Attorneys

THE NORRIS PETERS CO., PHOTO-LITHO., WASHINGTON, D. C.

UNITED STATES PATENT OFFICE.

JOHN BOWMAN ATWATER, OF CHICAGO, ILLINOIS.

ELECTRIC MOTOR.

SPECIFICATION forming part of Letters Patent No. 539,849, dated May 28, 1895.

Application filed September 24, 1894. Serial No. 523,956. (No model.)

*To all whom it may concern:*

Be it known that I, JOHN BOWMAN ATWATER, a citizen of the United States, residing at Chicago, in the county of Cook and State of Illinois, have invented certain new and useful Improvements in Electric Motors; and I do hereby declare the following to be a full, clear, and exact description of the invention, such as will enable others skilled in the art to which it appertains to make and use the same.

My invention relates to improvements in electric motors, and the invention consists, mainly, of the combination of one or more cam-ring-tracks, and suitable, electrically operated traction levers adapted to be pressed against said track successively, at intervals, and thereby rotate the same.

It also consists in certain other novel constructions, combinations and arrangements of parts as will be hereinafter more particularly set forth and claimed.

Figure 1:
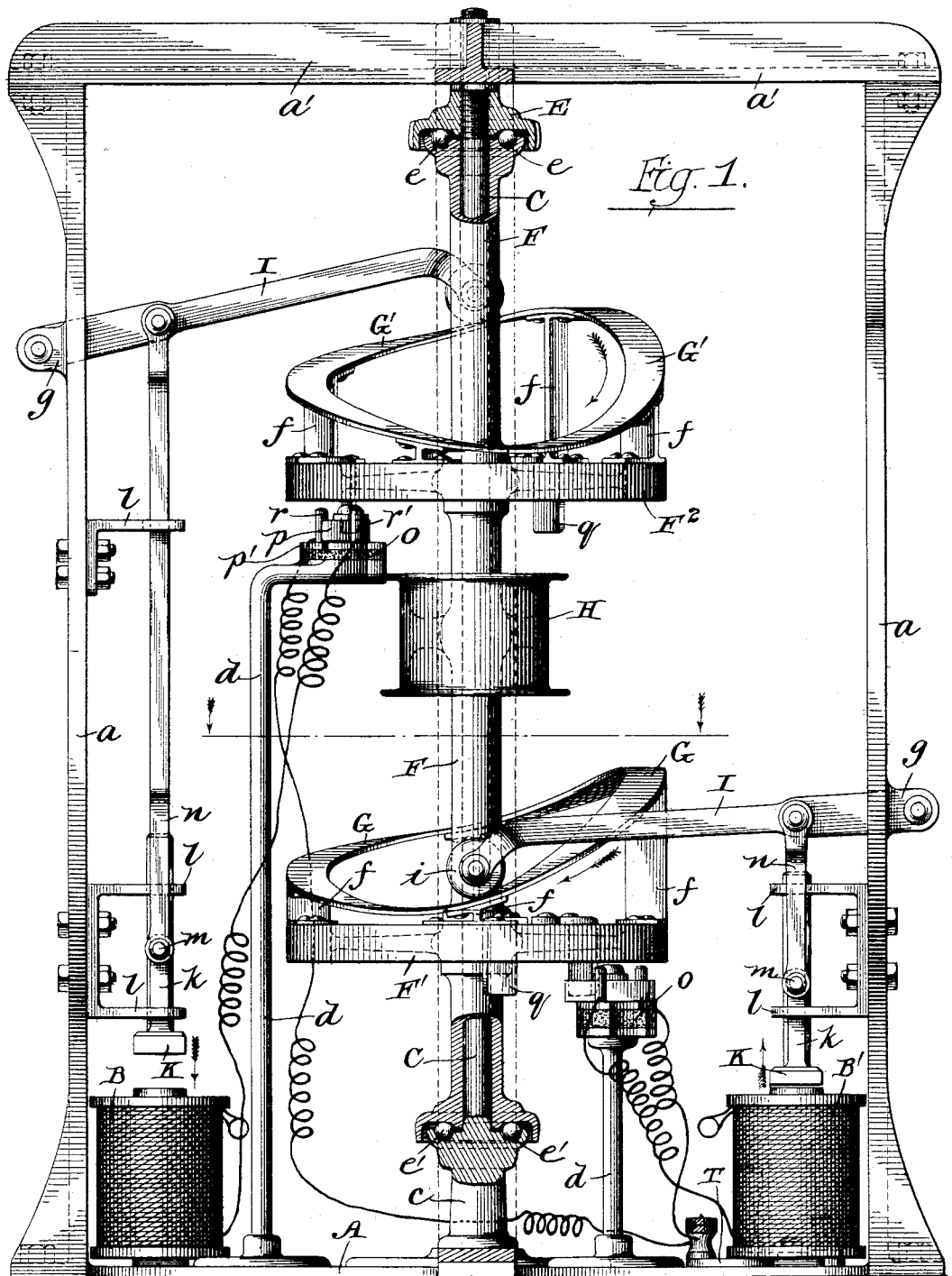
Figure 2:
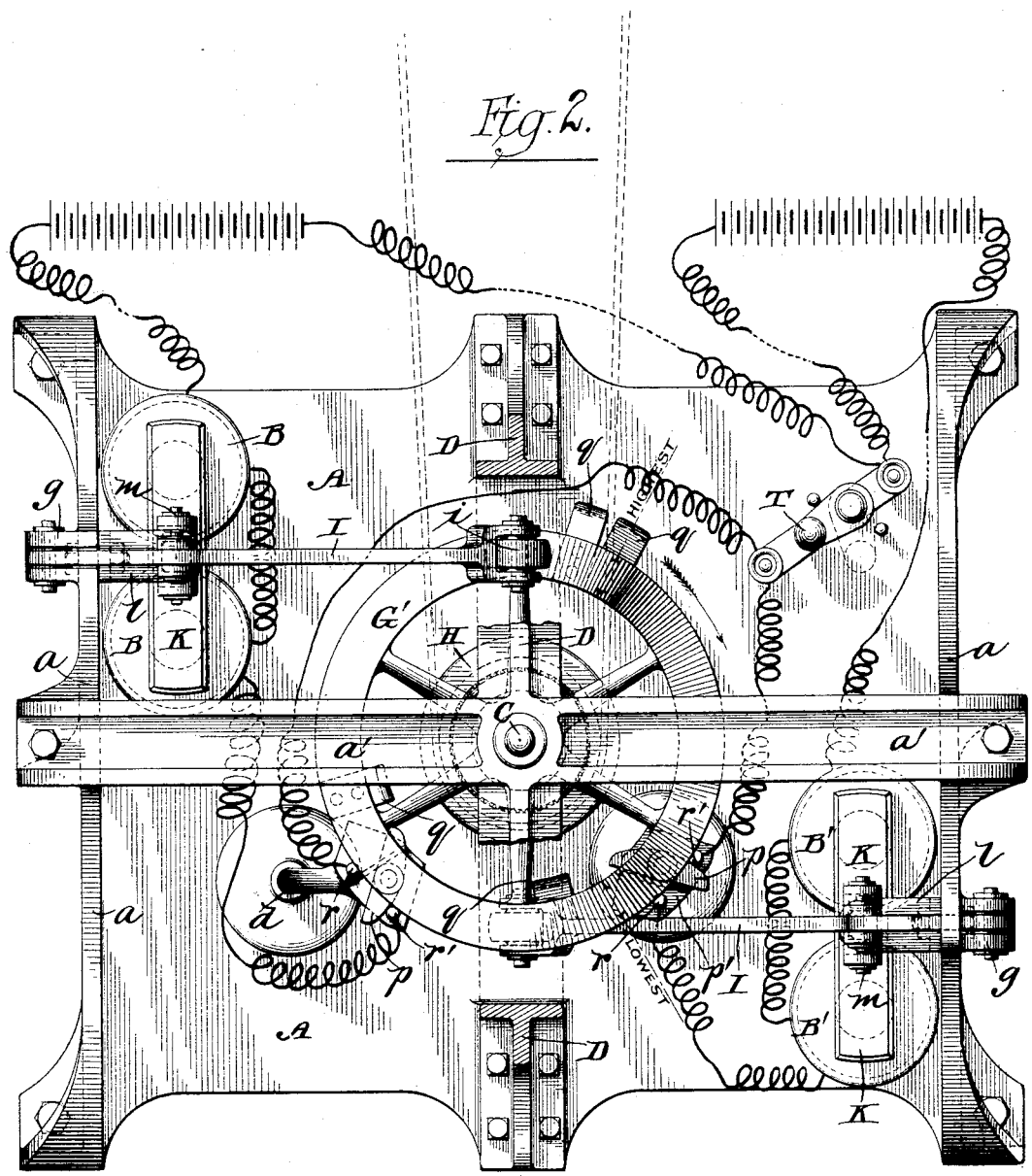
Figure 3:
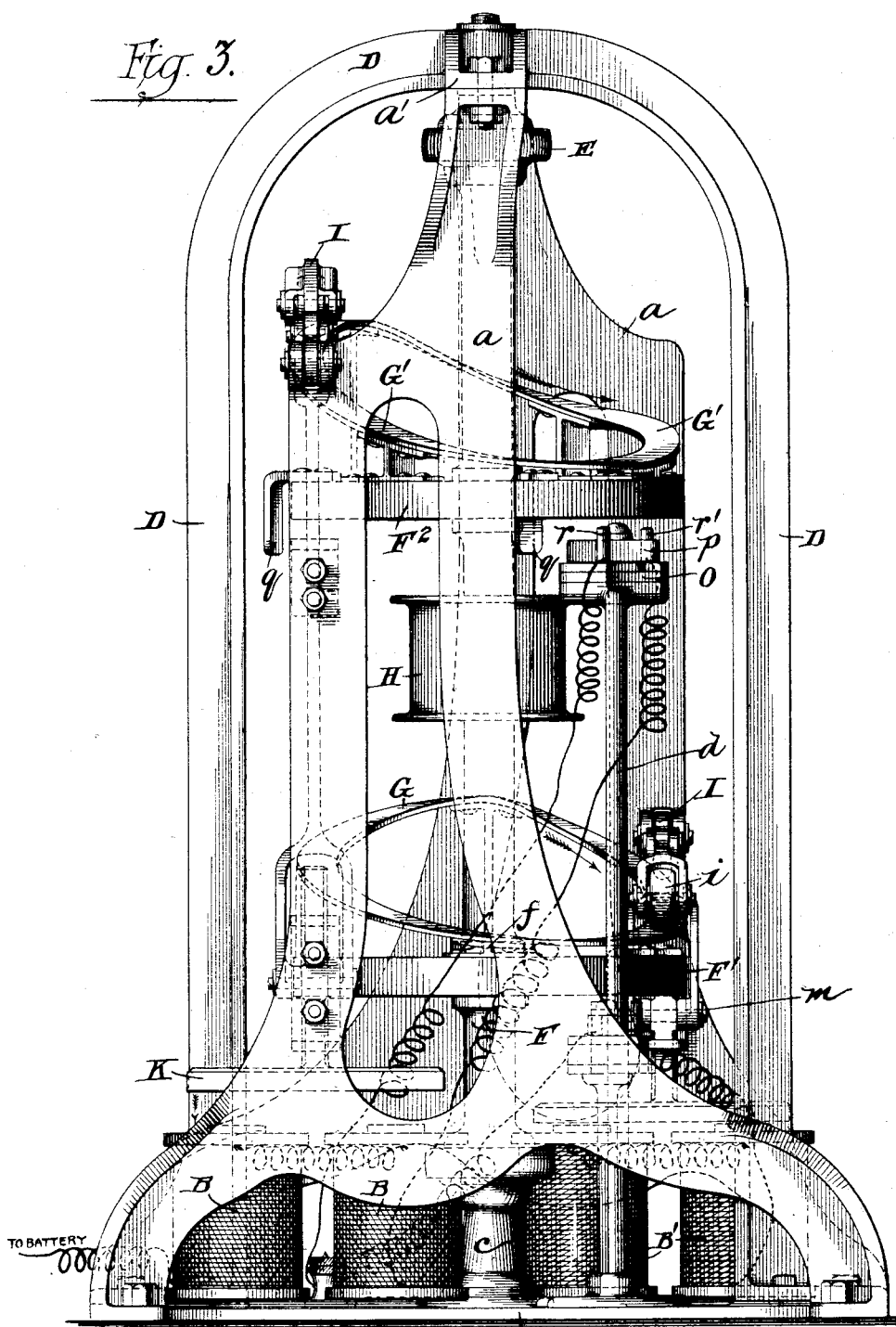
Figure 6:
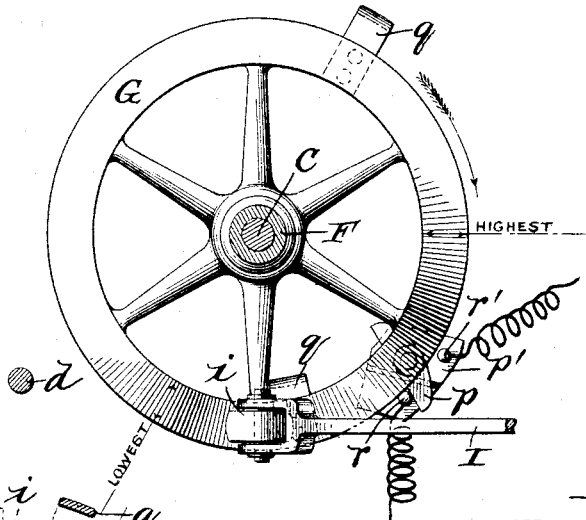
Figure 7:
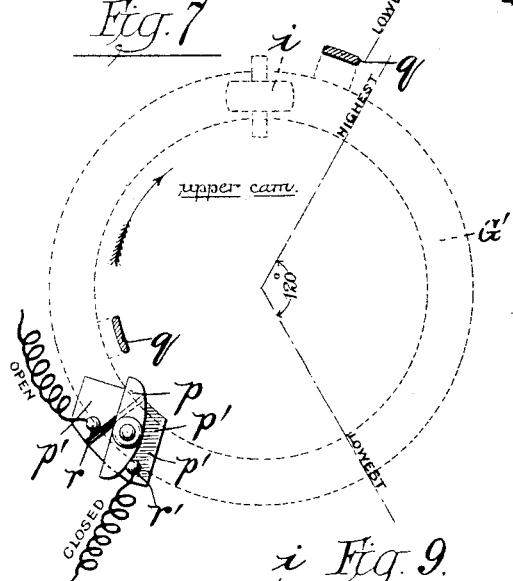
Figure 8:
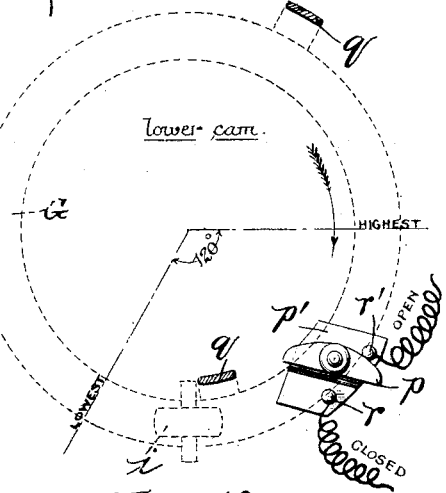
Figure 9:
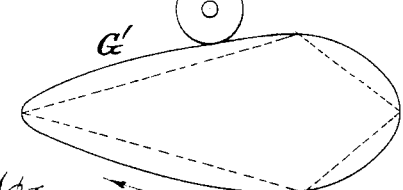
Figure 10:
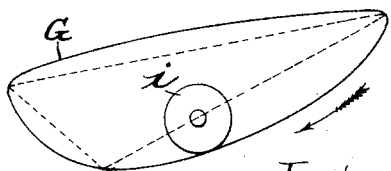

In the accompanying drawings, Figure 1 represents a side elevation, partly in section, of the devices embodying my invention. Fig. 2 represents a top plan view, partly broken away, of the same. Fig. 3 is an end elevation of said devices. Fig. 4 is a side elevation, partly in section, of another form of my motor, in which only one cam-ring track is employed. Fig. 5 is a detail top plan view of the same. Fig. 6 is a detail top plan view of one of the cam-ring tracks, showing one of the switches and one of the lever-arms in place. Figs. 7 and 8 represent diagram views of the respective upper and lower cam-ring tracks, showing their relative highest and lowest points; and Figs. 9 and 10 are diagram views showing the relative inclinations or angles of the surfaces of the two cam-ring tracks.

A in the drawings, is the bed plate of my motor and it has mounted upon it two vertical main frames, $a$, a cross tie $a'$, electro magnets B, B', a central column or stationary shaft C and upright switch supports $d$, $d$. Upon the base plate is also mounted an upright arched yoke D, connecting, at the top, with the cross tie of the main frame, thus forming an additional cross tie at the top of the machine. This yoke also has each leg or upright attached to the base at a point in a line passed through the shaft at right angles to one drawn through the shaft on the line of the main frames. This forms the entire frame work of the machine upon which are mounted all the working parts.

The vertical shaft C has its lower end firmly secured in or forming part of a step or pedestal $c$ to guard against rotation and other movements, and is threaded and screwed into the center of the top of the arched yoke at the point of the intersection of the cross ties where a suitable boss is formed to receive it, and the thread is extended down on said shaft to a point considerably below the lower face of the said boss, to receive a cup shaped thrust collar E having annular grooves in its lower face to receive small steel balls $e$ to form a ball bearing for the revolving mechanism below. Upon the upper face of the pedestal is formed an annular groove for the reception of the small balls $e'$ to form the ball bearing for the revolving mechanism resting thereon and mounted upon the vertical shaft.

The revolving mechanism consists primarily, of an upright hollow shaft or column F mounted to turn freely upon the vertical shaft by means of its cup shaped ends which rest against the anti-friction balls $e$ and $e'$ respectively, and having a fly wheel F' of suitable diameter and weight mounted upon it at a point near its lower end. This fly wheel has secured upon its upper face, by suitable supports $f$, a circular cam-ring-track G which has no two points of its periphery and upper surface, of the same height or distance from the upper face of the fly wheel, but beginning at its highest point, the descent of the track covers two hundred and forty degrees of the ring, and the ascent one hundred and twenty degrees, thus making a descent of two thirds and a rise of one third of the length of the track.

About midway of the hollow shaft is mounted an ordinary flanged driving pulley H from which the power is transmitted by belt or otherwise to any mechanism to which the power is to be applied. Near the top of the hollow shaft is mounted another fly wheel $F^2$ and cam track G' exactly identical with the wheel and track F' and G, just described, but with the highest point of its cam track located sixty degrees in the rear of the lower cam track, that is, it will pass a given point sixty degrees later in the revolution of the revolving mechanism.

On the main frame at a point in height corresponding to about the center of the rise of the lower cam track is formed a bifurcated lug $g$ which forms the fulcrum of the roller lever I for the lower cam. This roller lever being pivoted in the aforesaid fulcrum extends half way across the machine and its outer end comes directly over the center of the cam track and is tangent to it on a line parallel to the cross tie $a$ of the frame. The outer end of the roller lever I is bifurcated and has journaled in it an anti-friction roller $i$ of suitable diameter and periphery to bear upon the cam ring track.

The foregoing description of the lower roller lever also exactly describes the upper roller lever except that it is located in height suitable for the upper cam and is attached to the opposite main frame.

Electro-magnets B B' of the required size, are secured to the base plate and located at an equal distance at each side of the center of each roller-lever and parallel to the main frame, and as close to the main frames as possible, and the armature K of each set of magnets is provided with an upwardly extending stem $k$ that passes through suitably formed guides $l$ located some distance apart and above the magnets, and rigidly secured to the main frames. From a point suitably located upon this stem, between the guides, is a boss, formed for the reception of the journal pin $m$ that passes through it and the lower ends of the bifurcated rod or pitman $n$ by which connection is made at a point directly above the center of the armature stem with the roller levers. It will thus be seen that these levers are controlled by the armatures or connecting rods, and of course, the armatures are actuated by the electro-magnets.

The switches O are respectively formed by locating and pivoting a suitably formed clip or lever $p$ upon the switch plates $p'$, that are carried by suitable columns $d$ mounted upon the bed plate so that one end of the clip projects beyond the outer end and the other end beyond the inner face of the rim of the fly wheel sufficiently to engage with and be operated by downwardly projecting lugs or arms $q$ screwed to the fly wheel rim. One of these lugs is so located that when the friction roller has reached the highest point of the cam track, said lug will come in contact with the outer end of the switch lever $p$ and throw it over and against an upwardly projecting pin $r$ which is connected with the battery and electro-magnets controlling the lever of that particular cam track and thus close the circuit.

The electro-magnets when magnetized, attract the armatures and they descend with their attendant mechanism including the rollers, and force the cam track around by the downward pressure of the rollers upon the inclined portions of the track. The ends of the switch levers are beveled to allow the lugs of the fly wheel to engage with and throw them over against the projecting pins that form the connection with the battery and still permit said lugs to pass them after said action. When the cam track has revolved sufficiently to lower the roller to the lowest point, the lug projecting downwardly from the inside of the fly wheel rim comes in contact with the other end of the switch lever and returns it to the original position which it held when it was thrown back by the first named lug. This brings it in connection with the other upwardly projecting pin $r'$ and breaks the circuit through the electro-magnets and renders them inert, and the roller is lifted by the cam track to the highest position and the operation is repeated indefinitely. When the lower cam-ring-track has revolved through sixty degrees from where its roller was at the highest point, the roller on the upper cam has reached its highest point preparatory to its descent and consequential driving action and thus, while one roller is traveling up the lifting or idle portion of the circumference of one cam ring track, the roller of the other lever is at work, the rollers being diametrically opposite as before described. The relative difference in the revolution between the time one roller is at its maximum height and the time the other will reach its maximum height is one hundred and twenty degrees, or the working roller is half way down the incline when its predecessor is at its lowest point and the cam-ring-track has sixty degrees to go before the ascending roller has reached the highest point and the descending roller has still sixty degrees of track upon which to work in unison with the preceding roller before it becomes inert. Thus it will be seen that a continuous rotating force is being applied to revolve the cam ring tracks and with them the connected fly wheels and hollow shaft, or column, and its driving pulley.

As shown in Figs. 4 and 5 I use only one cam-ring-track and have both the rollers of the electrically operated levers bear upon the same but upon opposite sides of the shaft. In this case both the switches are arranged under the one fly wheel and the arms $q$ engage them successively at intervals. The belt wheel H is arranged below the fly wheel in this construction. The operation of this form of my motor is substantially the same as the other, the only difference being that both the operating levers act upon one cam ring track instead of upon two. Any suitable electric switch T can be introduced into the circuit from the battery or dynamo as shown in Fig. 2.

It is obvious that four, six or more traction levers with rollers might be employed, but with such change, the number of levers, of course, an additional number of magnets and switch operating arms would be required.

What I claim as my invention is—

1. The combination of a revolving cam ring track and electrically operated levers adapted, respectively to be pressed successively at intervals against said track and thereby revolve the same, substantially as described.

2. The combination with electro magnets and power transmitting means, of a revolving cam ring track, traction levers operated by said magnets and adapted respectively to successively and at intervals press against and revolve said cam ring track, and switching means operated by the movement of the ring track, whereby the electric current is periodically switched from one to the other set of the electro magnets, substantially as described.

3. In combination with a revolving cam ring track, a fly wheel carrying switch operating arms, power transmitting mechanism; the revolving cam ring track, the fly wheel and power transmitting mechanism being connected to one another, electrically operated traction levers adapted to bear upon said cam ring track, and a switch for shifting the current for operating said levers, substantially as described.

4. The combination with cam ring tracks formed with relatively acute and obtuse angled inclined surfaces, and connected to power transmitting means, of a plurality of electrically operated traction levers each provided with a friction wheel and adapted respectively to successively engage, at intervals with the cam ring track, the wheel of one lever being arranged in a diametrically opposite position to that of the other, an electric switch, means for operating the same and a fly wheel, substantially as described.

5. In an electric motor, the combination of revolving ring tracks, a plurality of traction levers, each provided with an armature and a friction wheel, the latter running upon the cam surface of the track, a fly wheel on a central shaft, power transmitting means, switch operating arms on the fly wheel, an electric switch, and electro magnets for operating said levers, substantially as described.

In testimony whereof I hereunto affix my signature in presence of two witnesses.

JOHN BOWMAN ATWATER.

Witnesses:
    H. C. GLEASON,
    M. L. ALLEN.